No. 675,609. Patented June 4, 1901.
C. W. PASHLEY.
MACHINE FOR GRINDING CUTTERS OF ENGRAVING MACHINES.
(Application filed Apr. 10, 1899.)
(No Model.) 2 Sheets—Sheet 1.
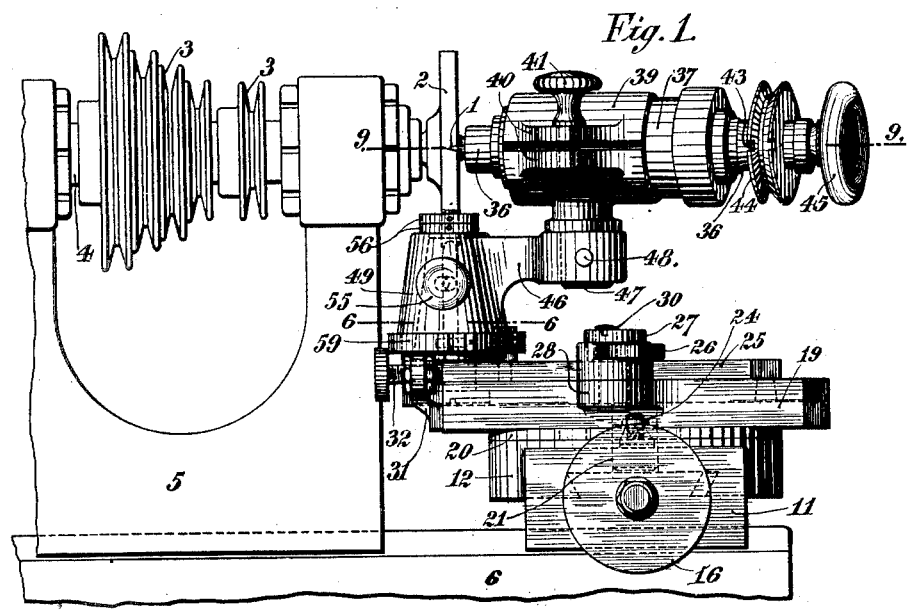
Fig. 1.
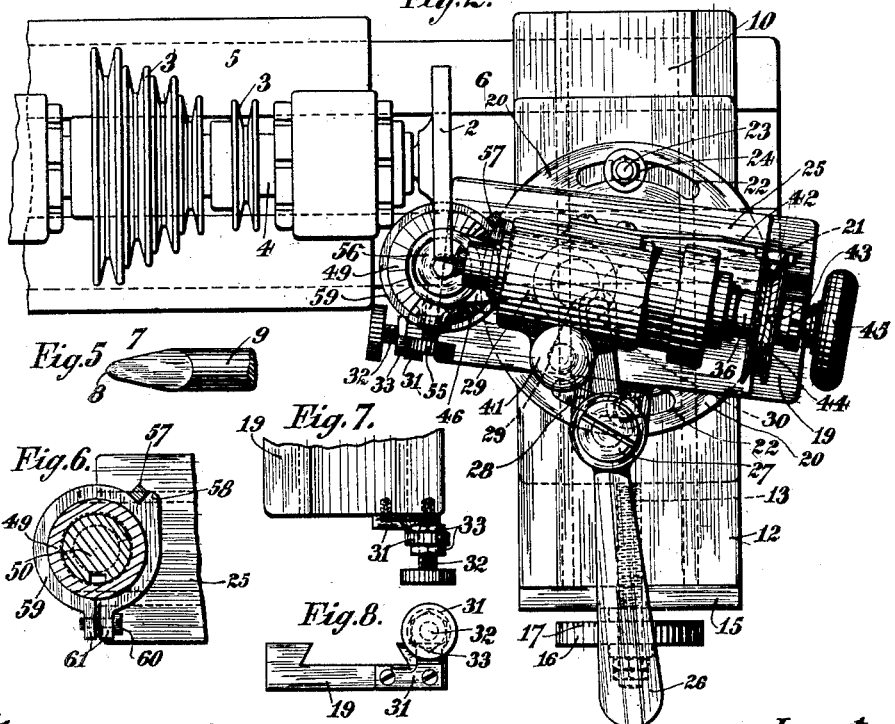
Fig. 2. Fig. 5. Fig. 6. Fig. 7. Fig. 8.
Witnesses.
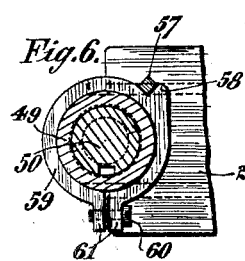
Inventor.
Charles Walter Pashley.
Attorney.
THE NORRIS PETERS CO., PHOTO-LITHO., WASHINGTON, D. C.

No. 675,609. Patented June 4, 1901.
C. W. PASHLEY.
MACHINE FOR GRINDING CUTTERS OF ENGRAVING MACHINES.
(Application filed Apr. 10, 1899.)
(No Model.) 2 Sheets—Sheet 2.
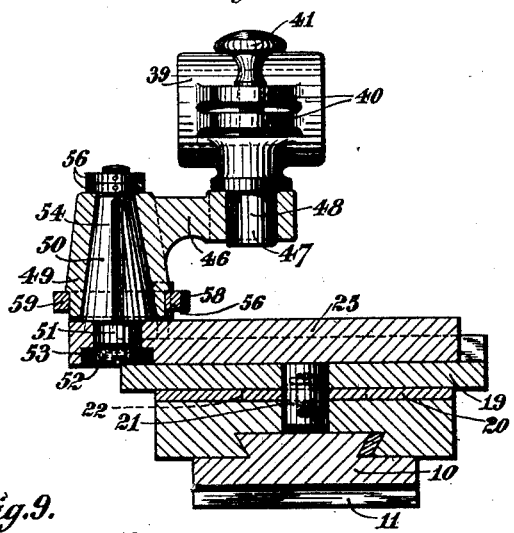
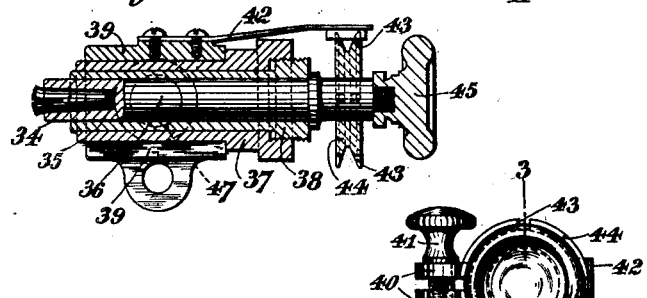
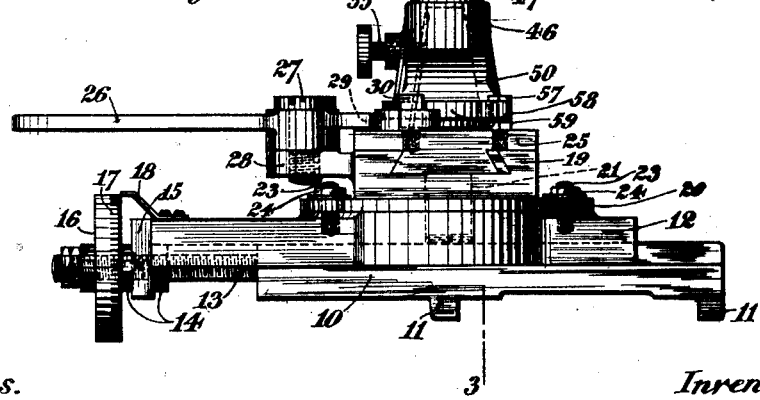

UNITED STATES PATENT OFFICE.

CHARLES WALTER PASHLEY, OF BROADHEATH, ENGLAND, ASSIGNOR TO THE LINOTYPE COMPANY, LIMITED, OF LONDON, ENGLAND.

MACHINE FOR GRINDING CUTTERS OF ENGRAVING-MACHINES.

SPECIFICATION forming part of Letters Patent No. 675,609, dated June 4, 1901.

Application filed April 10, 1899. Serial No. 712,567. (No model.)

*To all whom it may concern:*

Be it known that I, CHARLES WALTER PASHLEY, of Broadheath, in the county of Chester, England, have invented certain new and useful Improvements in Machines for Grinding the Cutters of Engraving-Machines; and I do hereby declare the following to be a full, clear, and exact description of the invention, such as will enable others skilled in the art to which it appertains to make and use the same.

The present invention relates to improvements in machines for grinding the cutters of engraving-machines. It is especially applicable to machines for grinding the cutters of the engraving-machine described in the specification of British Letters Patent No. 11,938 of 1895. The cutter of such a machine is rectangular in cross-section and gradually tapers in the direction of its nose. The latter is convex. The method in use hitherto for grinding the tapering faces of the cutter has been as follows: The cutter is held in a chuck capable of a rotary motion about its axis within a sleeve pivoted in a suitable support, so as to be capable of being swung about a horizontal axis. This axis is at right angles with that of the grinding-wheel or lap. The said support is pivoted so as to be turned about a vertical axis, which is provided by a post standing in front of the lap. The chuck is turned in the sleeve in order that first one face of the cutter and then another may be presented to the lap. There is combined with the chuck and the sleeve in which it turns a gage and detent adapted to control the angle through which the sleeve is turned in order that all the tapering faces may be of the same width. The chuck and sleeve are turned more or less about the vertical axis to grind the said faces at the desired angle with the axis of the cutter and about the horizontal axis, so as to move the whole of each face past the lap to prevent them being ground hollow.

The principal imperfection in the method just described is the absence of a stop other than the face of the lap adapted to limit the motion of the cutter about the vertical axis in the direction of the lap. Now it has been found that a lap two inches in diameter is reduced one five-hundredth of a diameter by the grinding of fifteen cutters. Consequently as the lap is worn down a cutter-face undergoing the process of being ground stands nearer to the axis of the lap than did the previous one, and no two ground cutters, although normally of the same size, are counterparts of each other to that degree of exactitude which is necessary in tools of the class above described if it can be obtained.

According to the present invention the cutter to be ground is mounted in a chuck carried by an ordinary slide-rest; but the bottom slide of the latter has combined with it a micrometer-screw to compensate for the above-described reduction of the diameter of the lap. The middle plate has combined with it an adjustable stop to limit the motion of the top slide, and consequently the horizontal motion of the cutter-faces over the face of the lap, and the chuck is pivoted upon a vertical post standing up from the top slide, the latter carrying a stop to limit the distance through which the cutter-nose can be turned toward the face of the lap, thereby providing for the exact adjustment of the angle of the ground-cutter faces with the cutter-axis.

Referring to the accompanying drawings, Figure 1 is a front elevation of the invention. Fig. 2 is a plan corresponding therewith. Fig. 3 is a section taken on the line 3 3 of Fig. 4. Fig. 4 is an end elevation from the right hand of Figs. 1 and 2 after the cutter has been swung into a position parallel with the lap-spindle. Fig. 5 is a side elevation of the front end of a cutter, showing one of its flat tapering faces and the convex nose. Fig. 6 is a section taken on the line 6 6 of Fig. 1. Fig. 7 is a detail plan, and Fig. 8 a side elevation from the left hand of Fig. 1, of the stop for the top slide. Fig. 9 is a sectional plan on line 9 9 of Fig. 1.

1 is the cutter to be ground; 2, the grinding-wheel or lap; 3 3, the driving-pulleys on its spindle 4; 5, the head-stock in which the said spindle revolves, and 6 the bed of the grinding-machine.

7, Fig. 5, is one of the tapering flat faces of the cutter, 8 its convex nose, and 9 its shank. The cross-section of the latter is not affected by the present invention.

10 is the bottom plate of the slide-rest. It fits down upon the machine-bed 6 and is prevented from moving transversely thereupon by a pair of ribs 11 11. Both the said bottom plate 10 and the head-stock 5 are held to the said bed 6 by any suitable means.

12 is the bottom or transverse slide of the rest, and 13 is its screw. The latter engages with the slide 12 by means of collars 14, fast to it and standing one on each side of a flange 15, fast to and depending from the front edge of the slide 12, as clearly shown in Fig. 4. The screw 13 engages with a nut (not shown) fast to the bottom plate 10 in the usual way. It has a micrometer-head 16, provided on its periphery with a suitable scale 17, which cooperates with an index 18, carried by the slide 12.

19 is the middle plate of the slide-rest; 20, its circular base; 21, the fixed post standing up from the slide 12 and upon which the middle plate 19 turns; 22 22, the arcual slots in the base 20; 23 23, the screws fast to the slide 12 and standing up through the said slots, and 24 24 the nuts by which the plate 19 is held to the bottom slide 12 after its angular position has been adjusted.

25 is the top slide. It is moved to and from the lap 2 by a lever 26, having its fulcrum in a screw 27, which is passed downward through it into a bracket 28, fast to and projecting from the front of the middle plate 19. To so move the top slide 25, the respective end of the lever 26 has a longitudinal slot 29 (shown in dotted lines in Fig. 2) formed in it and which receives a stud 30, standing up from the said slide 25.

31 is a bracket upon the end of the middle plate 19 next to the lap 2. 32 is a milled-head screw working through it opposite to the respective end of the top slide 25 to serve as a stop for the motion of the slide 25 toward the lap 2. 33 33 are two lock-nuts on the shank of the screw 32, one on each side of the bracket 31, to lock the said stop in its adjusted position.

Turning now to the cutter and its chuck, 34 is a split resilient quill to receive the shank 9 of the cutter. It fits in a bore 35 in the end of the round spindle 36, which is capable of being turned in the sleeve 37.

38 is a lining interposed between the spindle 36 and the sleeve 37.

39 is a split ring adapted to receive and clip the sleeve 37. To enable it to do so tightly, each of its ends has a tab 40, and a tightening-screw 41 is passed through one into the other. The cutter-shank 9 is held tightly to the spindle 36 by the resilience of the quill 34 in the bore 35, both being preferably tapered to facilitate such holding, while the spindle 36 is held to the ring 39 by a spring-detent 42, fast on the latter and adapted to engage in any one of a series of notches 43 in the periphery of a pulley 44, fast on the end of the spindle 36, which projects beyond both ring 39 and sleeve 37 for that purpose and also carries a disk 45, by which the cutter 1 can be turned. The number of notches 43 corresponds with the number of faces 7 on the cutter, and the cutter-shank 9 must be adjusted in the spindle 36 so that when the detent 42 is in a notch 43 the face 7 to be ground shall be parallel with the vertical plane which passes through the axis of the lap 2. The ring 39 is held to a horizontal arm 46 by a shank 47, fast to the under side of it and fitting in a hole in the end of the arm 46, in which position it is pinned by a pin 48, passed through both arm end and shank 47. The opposite end of the arm 46 terminates in a socket 49, which fits over a vertical post 50, fast to and standing up from the top slide 25, opposite to the face of the lap 2, preferably opposite to the central portion of it. Both socket 49 and post 50 are preferably tapered, as shown. The post 50 is shown in Fig. 3 as held to the slide 25 by means of a reduced end 51 passed down through the said slide and screw-threaded to receive a nut 52, the bottom face of the said slide 25 having a recess 53 to receive the said nut.

54 is a vertical groove in the side of the post 50 to receive the nose of a set-screw 55, working through the socket 49, when it is desired to hold the socket 49 to the post 50. There will be some wear and tear between the two last-mentioned parts, so that a vertical groove 54 as distinguished from a hole is necessary to receive the nose of the screw 55.

56 56 are a pair of nuts on the screw-threaded top of the post 50 to keep the socket 49 down upon the slide 25. 57 is a fixed stud standing up from the said slide near the socket 49, and 58 is a shoulder on the socket 50 for the purpose of engaging the said stud to limit the distance through which the cutter 1 can be moved toward the face of the lap 2. The object of such limitation is to provide that none of the faces 7 shall be ground wider than the others and also that all of them shall be exactly at the same angle with the axis of the cutter. As the stud 57 is fixed and the angular adjustment of the circular base may not be exact enough, there is a shoulder 58. It is a projection from a split ring 59, which embraces the bottom portion of the socket 49, and is held upon it adjustably by a set-screw 60, passed through one and into the other of a pair of outwardly-projecting tabs 61 on the split ends of the said ring.

The invention is used as follows: To begin with, the diameter of the lap 2 is measured to ascertain if it has been reduced by use, and if it has the reduction is compensated for by turning the micrometer-screw head 16 until the axis of the arm 46 is at the same distance from the face of the lap 2 as it was before the latter became reduced in diameter. The cutter to be ground is then inserted in the quill 34 and the spindle 36 turned until the detent 42 engages in one of the notches 43. The screw 41 is then tightened. The circular base 20 is adjusted angularly about the post 21 by means of the slots 22 22 and the set-screws 23 23 for the desired angle of the cutter-faces 7 with the axis of the cutter 1. The stop 32 is next adjusted for the length of the faces 7. The shoulder 58 is adjusted for the angle of the faces 7 with the axis of the cutter by loosening the screw 60, swinging the cutter-chuck upon the post 50 until the axis of the shank 9 stands at the said angle with the axis of the lap 2, turning the ring 59 about the socket 49 until the shoulder 58 bears against the stud 57, fixing the said ring upon the said socket by tightening the screw 60, and fixing the cutter-chuck to the post 50 by screwing the nose of the screw 55 into the groove 54. The shank 9 is then moved from right to left past the lap 2 by means of the lever 26 until the plate 25 is stopped by the stop 32. When it is so stopped, the grinding of the particular face 7 is finished. The nose of the screw 55 is then screwed out of the groove 54 and the cutter-chuck gradually swung to the front until the axis of the cutter 1 is at right angles with that of the lap 2, thereby grinding the respective portion of the nose 8. The cutter is then moved clear of the lap 2, the screw 41 slackened, the detent 42 disengaged from the pulley 44, the latter turned through the proper arc, the said detent engaged in the notch 43 then opposite to it, and the face 7 then opposite the lap 2 and the respective portion of the convex nose 8 ground in the way above described.

I claim—

The hereinbefore-described combination of slide-rest having base, bottom slide, micrometer-screw adapted to move the latter over the former, middle plate angularly adjustable upon the bottom slide and top slide; lever-handle adapted by having its fulcrum upon the middle plate to move the top slide; adjustable stop to limit one motion of the top slide; vertical post on the top slide; cutter-chuck pivoted thereupon; and stop on the said top slide adapted to limit the angular motion in one direction of the said chuck about the said post.

In testimony that I claim the foregoing as my invention I have signed my name in presence of two subscribing witnesses.

CHARLES WALTER PASHLEY.

Witnesses:
 THOMAS TAYLOR,
 JOHN EDWARD STANLY.